W. V. TURNER.
HIGH SPEED REDUCING VALVE.
APPLICATION FILED SEPT. 9, 1904.
924,018.
Patented June 8, 1909.
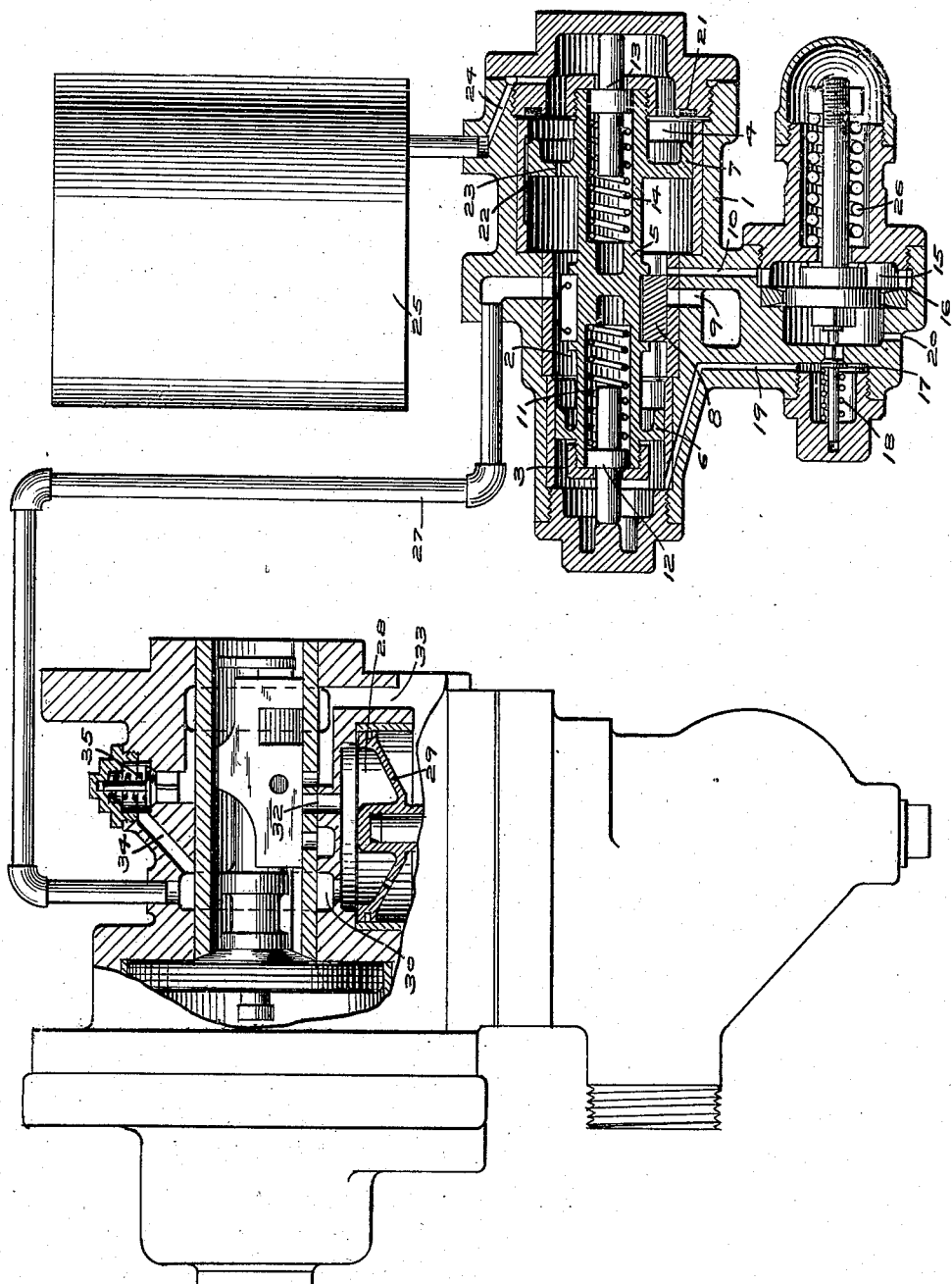
WITNESSES
INVENTOR

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

HIGH-SPEED-REDUCING VALVE.

No. 924,018.   Specification of Letters Patent.   Patented June 8, 1909.

Application filed September 9, 1904. Serial No. 223,829.

*To all whom it may concern:*

Be it known that I, WALTER V. TURNER, a citizen of the United States, residing in Wilkinsburg, county of Allegheny, and State of Pennsylvania, have invented a certain new and useful Improvement in High-Speed-Reducing Valves, of which the following is a specification.

This invention relates to fluid pressure brakes, and more particularly to what is known as a high speed reducing valve adapted to be applied to the brake cylinder for permitting the escape of air above a certain pressure and thereby limiting the brake cylinder pressure in service applications to a predetermined maximum degree, but operating in emergency applications to permit the accumulation of a higher pressure in the brake cylinder and to retain said higher pressure for a limited period of time and then allow the same to reduce or blow down to the predetermined maximum degree for which the device is adjusted. A safety valve for blowing down the brake cylinder pressure has heretofore been employed for this purpose, and it has also been proposed to use a valve mechanism operating in emergency applications for cutting off communication from the brake cylinder to the safety valve for a limited period of time, after which the communication is again opened and the brake cylinder pressure reduced to the desired amount.

The principal object of this invention is to provide an improved valve device for this purpose, and one in which the brake cylinder outlet for both service and emergency applications may be controlled by a single valve, thereby securing a greater efficiency and certainty of action with a simplified construction.

Another important feature of my invention comprises a connection from the reducing valve device to the chamber above the emergency piston of the triple valve device, whereby a rapid flow of air from the auxiliary reservoir to the reducing valve device occurs in emergency applications, which operates to hold the brake cylinder outlet closed for a limited period of time.

I will now describe more particularly one form of valve device embodying my invention, reference being had to the accompanying drawing which shows such valve device in section diagrammatically connected with a standard quick action triple valve, a part of which is also shown in section. According to the construction shown the casing 1 contains the valve chamber 2, piston chambers 3 and 4, with pistons 6 and 7 connected by stem 5 which operates slide valve 8. Springs 11 and 14, with stems 12 and 13, are provided for normally bearing against opposite ends of the casing and normally holding the pistons and valve in a central position. These springs may be conveniently located in hollow spaces in the ends of the piston stem. The main slide valve 8 controls the brake cylinder outlet port 9 leading to the atmosphere, and also the port 10 leading to the chamber 15 and diaphragm 16, which operates the small vent valve 17 for controlling the release of air from the passage 19 and the cylinder 3 back of piston 6. The adjustable spring 26 opposes the fluid pressure upon diaphragm 16 and may be set to cause a blowing down of the brake cylinder pressure to any desired maximum degree. A light spring 18 acts to return the valve 17 to its seat when the pressure upon the diaphragm is less than that for which the spring 26 is adjusted. In order to give the desired volume to the chamber 4 back of piston 7, a reservoir 25 of the desired capacity may be connected thereto by a port 24. A groove 22 is located in the bushing around the piston 7 and a port 23 is provided through said piston.

The valve device may be connected to the brake cylinder in any desired manner and then operates as follows:—The valve normally occupies a central position, as shown, with the outlet port 9 closed and port 10 leading to diaphragm chamber 15 open. When air is admitted to the brake cylinder in a service application, the pressure therein, and consequently in the valve chamber 2 between the pistons accumulates less rapidly than in emergency applications and the capacity of the port 23 and groove 22 past piston 7 is such as to permit the equalization of the pressure into the chamber 4 and reservoir 25 as rapidly as it accumulates in chamber 2, consequently the piston remains in equilibrium and there is no tendency for the valve to move. The piston 6, which is of less diameter than piston 7, is fitted loosely into its bushing, so that when the diaphragm valve 17 is closed the pressure from chamber 2 readily equalizes around the piston into chamber 3 and passage 19. The valve, therefore, remains in its normal position as the brake cylinder pressure rises in chamber 2 and diaphragm chamber 15 until such pressure reaches the degree for which the spring 26 is adjusted. When this pressure is exceeded the diaphragm is depressed and opens the small valve 17, thereby venting the pressure from the chamber 3 back of piston 6 and causing the same to move the slide valve 8 to open the outlet port 9 to the atmosphere. This port will be opened sufficiently to discharge air from the brake cylinder substantially as fast as it is admitted through the triple valve and thereby limit the brake cylinder pressure to the predetermined maximum degree in service applications. As soon as the triple valve is lapped and the brake cylinder pressure is reduced to the predetermined amount the spring 26 draws up the diaphragm and permits the valve 17 to close whereupon, as the pressure immediately equalizes around the piston 6, the spring 11 moves the pistons and slide valve 8 back to normal position closing the outlet port 9, and preventing further discharge from the brake cylinder.

It will be noted that the piston 7 remains substantially balanced as to air pressure during service applications. When an emergency application is made the air rushes into the brake cylinder much more rapidly and the pressure accumulates in chamber 2 between the pistons faster than it can equalize through the ports 22 and 23, consequently as the piston 7 has the larger area it is immediately moved over and seated against its gasket 21, thereby closing the port 10 and cutting off the groove 23. The valve will then remain in this position during the limited period of time required for the high brake cylinder pressure to equalize through the port 22 into chambers 4 and 25 and this period may be made anything desired by properly proportioning the size of the port 22 to the capacity of the chamber. During this period the higher brake cylinder pressure, which is considerably in excess of that for which the spring 26 is adjusted, has been retained in the brake cylinder, since the port 10 leading to the diaphragm remains closed. In the meantime, the pressure has equalized around the piston 6, so that as soon as the pressure in chamber 25 has risen to nearly equal that of the brake cylinder and chamber 2 the spring 14 will move the pistons and valve back to normal position, thereby opening the port 10 leading to diaphragm chamber 15. As the pressure then admitted to the diaphragm is much higher than that for which the spring 26 is adjusted the valve 17 is immediately opened, thereby venting the pressure from the back of piston 6 and causing the same to move the valve 8 to open the outlet port 9. The brake cylinder pressure is then rapidly reduced to the predetermined maximum degree for service applications and the valve closes as before described.

While the reducing valve device may be connected directly to the brake cylinder in the usual way, I prefer to connect the same to the emergency piston chamber of the standard quick action triple valve device, whereby a quicker and more positive action of the device may be secured in emergency applications. The drawing shows a standard triple valve device having the usual piston and slide valve, brake cylinder passage 33, quick action port 32 for supplying air from the auxiliary reservoir to the emergency piston 29, all of which is well known in the art.

The pipe 27 is indicated as a means for connecting the high speed reducing valve with the port 30, which communicates with the emergency piston chamber 28 of the triple valve device. According to this feature of my invention, it is also desirable to provide means for supplying air from the brake cylinder to the reducing valve as rapidly as it is supplied to the brake cylinder in excessive service applications, in order that said brake cylinder pressure may be limited to the desired amount, and this is illustrated in the drawing by the passage 34, which may be conveniently located in the triple valve body and connects the brake cylinder passage 33 with the pipe 27 leading to the reducing valve device. A check valve 35 may be located in the passage 34 to prevent the flow of air direct from the emergency piston chamber to the brake cylinder in emergency applications. The operation of the device with this form of connections is the same as that before described in service applications of the brakes, since at this time the quick action port 32 of the triple valve is not opened. In emergency applications, however, the triple valve moves back and opens communication from the auxiliary reservoir through port 32 to the emergency piston chamber 28 and consequently through port 30 and pipe 27 to the reducing valve chamber. This produces a sudden and rapid rise of pressure upon the piston 7 causing the same to move instantly to its seat against the gasket. By this means it will be apparent that the action is more prompt and positive than when depending upon the brake cylinder pressure alone.

The higher pressure which may accumulate momentarily in chamber 2 then equalizes through the usual port in the emergency piston 29 with the equalized pressure of the auxiliary reservoir and brake cylinder and when the pressure in chamber 25 has increased the required amount the reducing valve will open as before described and discharge air from the brake cylinder through outlet port 9, this air being drawn through passage 34 and check valve 35. It will be observed that this feature of my invention relating to the connection of the reducing valve to the emergency piston chamber is not limited to the particular form of reducing valve device shown, but is also applicable with a standard form of high speed reducing valve or with any other preferred design.

Having now described my invention, what I claim as new and desire to secure by Letters Patent is:—

1. A high speed reducing valve for air brakes, comprising a valve controlling an outlet port from the brake cylinder, a piston for operating said valve, and a valve device governed by the brake cylinder pressure for controlling the pressure on one side of said piston.

2. A high speed reducing valve for air brakes, comprising a valve controlling an outlet port from the brake cylinder, a piston for operating said valve, and means governed by the brake cylinder pressure for controlling the release of air from one side of said piston.

3. A reducing valve device for air brakes, comprising a valve for controlling an outlet port from the brake cylinder, a movable abutment exposed on one side to brake cylinder pressure for operating said valve, and means controlled by the brake cylinder pressure for varying the pressure upon the opposite side of said abutment.

4. A reducing valve device for air brakes, comprising a valve for controlling an outlet port from the brake cylinder, a movable abutment exposed on one side to brake cylinder pressure for operating said valve, and a diaphragm and valve operated by the opposing pressures of the brake cylinder and an adjustable spring for reducing the pressure on the opposite side of said abutment.

5. A reducing valve device for air brakes, comprising a valve for controlling an outlet port from the brake cylinder, a piston or movable abutment for operating said valve, means subject to the brake cylinder pressure in service applications for varying the pressure upon one side of said abutment, and means operating in emergency applications for holding said outlet closed for a limited period of time.

6. A reducing valve device for air brakes, comprising a valve for controlling an outlet from the brake cylinder, means operated by the brake cylinder pressure for controlling said valve, and means operating in emergency applications of the brake for holding said valve closed for a limited period of time.

7. A reducing valve device for air brakes, comprising a valve for controlling an outlet port from the brake cylinder, a movable abutment for operating said valve, means subject to the brake cylinder pressure in service applications for controlling the pressure upon one side of said abutment, and means operated by the rapid rise in pressure upon the abutment in emergency applications for holding said valve closed for a limited period of time.

8. A reducing valve device for air brakes, comprising a valve for controlling an outlet port from the brake cylinder, a movable abutment for operating said valve, means subject to the brake cylinder pressure in service applications for controlling the pressure upon one side of said abutment, a piston operated by the rapid rise in pressure in emergency applications for temporarily holding said valve closed, and means for gradually equalizing the pressures upon opposite sides of said piston.

9. A reducing valve device for air brakes, comprising a valve for controlling an outlet from the brake cylinder, a movable abutment for operating said valve, an adjustable valve device normally subject to brake cylinder pressure for controlling the pressure upon one side of said abutment, and means operating in emergency applications for temporarily closing communication from the brake cylinder to said adjustable valve device.

10. A reducing valve device for air brakes, comprising a valve for controlling an outlet from the brake cylinder, a movable abutment for operating said valve, an adjustable valve device normally subject to brake cylinder pressure for controlling the pressure upon one side of said abutment, and a port also governed by the main valve for controlling communication from the brake cylinder to said adjustable valve device.

11. A reducing valve device for air brakes, comprising a valve for controlling an outlet from the brake cylinder, a movable abutment for operating said valve, a diaphragm and a valve for controlling the pressure upon one side of said abutment, a port governed by the main valve for controlling communication from the brake cylinder to said diaphragm, and means operating in emergency applications for temporarily closing said port.

12. A reducing valve device for air brakes, comprising a valve for controlling an outlet from the brake cylinder, a movable abutment for operating said valve, an adjustable valve device normally subject to the brake cylinder pressure for controlling the pressure upon one side of said abutment, a piston acting in emergency applications to move said main valve to close communication from the brake cylinder to said adjustable device, and means for gradually equalizing the fluid pressure upon opposite sides of said piston, and springs for returning said main valve to its normal position.

13. In a fluid pressure brake, the combination with a quick action triple valve device of a reducing valve device, for controlling an outlet port from the brake cylinder, and a connection from the emergency piston chamber of the triple valve device to the reducing valve for supplying air to open the same.

14. In a fluid pressure brake, the combination with a reducing valve device for controlling an outlet port from the brake cylinder, of a triple valve device and means operated thereby for supplying air from the auxiliary reservoir to the reducing valve device in emergency applications.

15. In a fluid pressure brake, the combination with a valve for controlling an outlet port from the brake cylinder, and a piston or movable abutment for operating said valve, of a triple valve device having means for supplying air from the auxiliary reservoir to said movable abutment.

16. In a fluid pressure brake, the combination with a reducing valve device having a piston and valve for controlling a brake cylinder outlet port, of a triple valve device having means operating in emergency applications for supplying air to said piston to open said valve.

17. A high speed reducing valve for air brakes, comprising a valve for controlling a free outlet port from the brake cylinder, and means operating in an emergency application of the brakes, for temporarily holding said outlet closed.

18. A high speed reducing valve for air brakes, comprising a valve for controlling an outlet port from the brake cylinder, and means operating in a service application of the brakes for opening said outlet when the pressure in the brake cylinder exceeds a predetermined amount.

In testimony whereof I have hereunto set my hand.

WALTER V. TURNER.

Witnesses:
R. F. EMERY,
JAS. B. MACDONALD.